United States Patent Office 3,400,175
Patented Sept. 3, 1968

3,400,175
TRANSPARENT IMPACT POLYSTYRENE COMPOSITIONS CONTAINING A DIOLEFIN RUBBER
Arnold B. Finestone and Richard C. Westphal, Leominster, Mass., assignors to Foster Grant Co., Inc., Leominster, Mass., a corporation of Delaware
No Drawing. Continuation of application Ser. No. 127,900, July 31, 1961. This application July 1, 1965, Ser. No. 468,995
14 Claims. (Cl. 260—880)

ABSTRACT OF THE DISCLOSURE

Substantially transparent thermoplastic compositions formed by polymerizing monomeric materials which include: (1) at least one monoalkyl aromatic hydrocarbon monomer; (2) at least one of methacrylic acid esters, itaconic acid esters, and acrylonitrile; and (3) at least one vinyl ester of a saturated organic acid; in the presence of a rubbery polymeric material, the polymerizable monomeric materials being present in amounts such that, if polymerized alone, a polymer having a refractive index within 0.005 unit of the refractive index of the rubbery polymeric material would be produced.

---

This application is a continuation of application Ser. No. 127,900, filed July 31, 1961 now abandoned.

This invention relates generally to high impact thermoplastic compositions which are clear, i.e., which are transparent or substantially transparent. More specifically this invention relates to high impact monoalkenyl aromatic materials which have good transparency.

It has long been known in the art that the impact value of polystyrene and similar alkenyl aromatic hydrocarbons can be significantly increased by the incorporation therein of rubbery materials. Such rubber modified products are known as impact monoalkenyl aromatic materials. Such materials are in great commercial demand due to their desirable physical properties and low cost. Typical applications wherein these materials are employed include refrigerator housings, razor case housings, machine parts, boxes and containers of various types.

Impact monoalkenyl aromatic materials may be formed by two general methods. The first method comprises merely mixing or blending a monoalkenyl aromatic polymer and a rubbery polymeric material. The second method is by inter-polymerization of a monoalkenyl aromatic monomer and a rubbery polymeric material. It is well known in the art that the latter method produces materials having improved impact values.

It has been found that it is exceedingly difficult, if at all possible, to prepare impact materials by the second method having good transparency. Normally, these inter-polymerized impact materials while possessing improved impact values are opaque or clouded such that they are inadequate for many commercial uses. For example, many boxes or containers could employ impact materials if clear impact materials were available.

Heretofore, clear impact materials, as hereinbefore defined, have only been available when produced by blending or mixing. It is obvious that such materials have only limited impact values.

We have now found that a clear high impact material can be formed by polymerizing a monoalkenyl aromatic monomer or a mixture of such monomers with a compatible monomer selected from the class consisting of methacrylic acid ester, itaconic acid esters, acrylonitrile or combinations thereof with a synthetic rubbery polymeric material having a refractive index between $n_D^{25}$—1.513 and $n_D^{25}$—1.576. The selected monomeric materials must be used in proportions which would, if polymerized alone, yield a copolymer or interpolymer having a refractive index within 0.005 units of the refractive index of the rubbery material employed. Surprisingly, this procedure will yield an impact monoalkenyl aromatic polymer having outstanding impact strength and excellent clarity.

We have further found that the moldability, viz. flow properties of the materials of the present invention may be greatly improved by the employment therein of a vinyl ester in monomeric form.

The particular method of interpolymerizing the ingredients set forth above has no direct significance as far as the clarity obtained. Thus, any of the well known free radical polymerization techniques may be employed in our invention. Bulk, suspension or emulsion polymerization methods have been employed with excellent results. Similarly either batch or continuous polymerization procedures can be used. It is only necessary that the loss of monomer be controlled so that no monomer is lost by volatilization during the polymerization stage. If such loss should occur, and one monomer leaves the polymerization at a faster rate than other monomers in the polymerization mass, it is obvious that the resulting polymeric product would have varying composition and thus the clarity would be greatly affected by such loss.

Compounding ingredients such as conventional antioxidants and plasticizers may be incorporated into the compositions of this invention. Thus, up to 2% by weight based on the finished compound or product may be used of an anti-oxidant to prevent possible degradation of the rubbery material. Examples of such anti-oxidants include 2,6 di-t-butyl-4-methyl phenol and alkylated aryl phosphites.

Catalysts that may be used are the free radical polymerization catalysts commonly used in ordinary sytrene polymerizations. Examples of these include t-butyl peracetate, t-butyl perbenzoate, di-t-butyl peroxide, 2,4-dichlorobenzoyl peroxide, p-chlorobenzoyl peroxide, acetyl peroxide, caprylyl peroxide, methyl ethyl ketone peroxide, hydroxheptyl peroxide, 2-azo-bis-isobutyronitrile, lauroyl peroxide and cumene hydroperoxide. Minimum concentrations of catalysts are preferred in this invention. Products of highest clarity are obtained when the monomer polymerizes thermally in the presence of rubber in the absence of catalysts.

Normal polymerization conditions may be employed in the practice of this invention. Thus, as is often preferred, each polymerization stage can be carried out under a blanket of nitrogen. The times and temperatures of polymerization may vary and are governed by the properties desired in the finished product. For example, each batch of monomer may be polymerized at one particular temperature or may be polymerized in various selected temperature stages. In general, since the polymerization is exothermic, the rate of polymerization is governed by the rate the heat and polymer can be removed from the polymerizing mass so that the nature and designing of the equipment used as well as the desired finished properties influences the time-temperature conditions of a polymerization stage.

Generally, our compositions are formed by polymerizing a mixture of (A) 98 to 65% by weight of the entire composition of a mixture of at least one monoalkenyl aromatic hydrocarbon monomer selected from styrene, vinyltoluene, vinylxylene, ethylvinylbenzene, and alpha methylstyrene, in amounts of 85 to 20% by weight of (A) and 15 to 80% by weight of (A) of at least one member of the class consisting of methacrylic acid esters, itaconic acid esters, and acrylonitrile, and (B) 2 to 35% by weight of the entire composition of a rubbery polymeric material having a refractive index between $n_D^{25}$—

1.513 and $n_D^{25}$—1.576. The proportion of materials in (A) are selected so that if polymerized alone, they would yield a copolymer or interpolymer having a refractive index within 0.005 units of the refractive index of the rubbery polymeric material.

For each specific comonomer or mixture of comonomers employed, the optimum proportions of ingredients may vary in accordance with the refractive indexes. A clear polymeric composition of styrene, methacrylic acid ester and a rubbery polymeric material is preferably formed by polymerizing a mixture of (A) 98 to 80% by weight of the entire composition of a mixture of at least one monoalkenyl aromatic hydrocarbon monomer in amounts of 85 to 20% by weight of (A) and 15 to 80% by weight of (A) of a methacrylic acid ester and (B) 2 to 20% by weight of the entire composition of the rubbery polymeric materials recited herein having a refractive index of $n_D^{25}$—1.513 to $n_D^{25}$—1.576 and preferably $n_D$—1.530 to $n_D^{25}$—1.576.

When itaconic acid esters are employed alone, or when various mixtures of itaconic acid esters, methacrylic acid esters and acrylonitrile, are employed as components of (A), the amounts employed preferably lie in the ranges recited above, i.e., 15 to 80% by weight of (A) and the rubbery material is employed in amounts of 2–20% by weight and preferably has a refractive index of $n_D^{25}$—1.530 to $n_D^{25}$—1.576. However, when acrylonitrile alone is employed as a component of (A), it is preferred to form the clear impact material by polymerizing a mixture of (A) 98–65% by weight of the entire composition of a mixture of at least one monoalkenyl aromatic hydrocarbon monomer in amounts of 80 to 65% by weight of (A) and 20 to 35% by weight of (A) of acrylonitrile and (B) 2 to 35% by weight of the entire composition of the rubbery polymeric materials recited herein preferably having a refractive index of $n_D^{25}$—1.550 to $n_D^{25}$—1.576.

The methacrylic acid ester employed in our invention corresponds to the general formula:

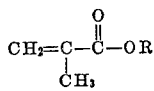

wherein R represents an alkyl radical containing from 1 to 8 carbon atoms. Typical examples of these methacrylic acid esters include methylmethacrylate, ethylmethacrylate, propylmethacrylate, n-butylmethacrylate, isobutylmethacrylate, t-butylmethacrylate, 2-ethylhexylmethacrylate, etc.

The itaconic acid esters employed in our invention correspond to the general formula:

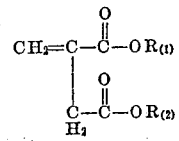

wherein $R_{(1)}$ and $R_{(2)}$ may be the same or different and each represent an alkyl radical containing from 1 to 6 carbon atoms. Typical examples of these itaconic acid esters include dimethylitaconate, dibutylitaconate, ethylmethylitaconate, dipropylitaconate, di-n-butylitaconate, di-isobutylitaconate, etc.

A vinyl ester may be employed to improve the flow properties of the advantageous clear impact materials of our invention. Preferably up to 5% by weight of the total composition of a vinyl ester is added to the system prior to polymerization and is polymerized therewith. Preferably the vinyl ester employed is an ester of a saturated organic acid in which the acid component has at least eight carbon atoms in its chain. Examples of such esters include vinyl stearate, vinyl laurate, vinyl palmitate, vinyl caproate, vinyl caprylate, vinyl myristate, vinyl pelagonate, etc. Obviously, the amount of vinyl ester employed must be adjusted so that the monomers yield a polymeric material having a refractive index within 0.005 unit of the rubbery polymeric material employed if said monomeric materials are polymerized alone.

The rubbery polyeric materials which may be employed in this invention include synthetic unsaturated rubbery polymeric derivatives of conjugated 4–6 carbon atom diolefins, as for example, rubbery copolymers of butadiene-styrene, acrylonitrile-butadiene, isoprene, chloroprene, butadiene, and dimethyl butadiene. It is only necessary that the rubbery component have a refractive index within the range of $n_D^{25}$—1.513 to $n_D^{25}$—1.576.

The following examples illustrate the invention, but are not to be construed as limiting. In these examples and in the foregoing specification, parts and percentages are by weight.

EXAMPLE 1

Into a suitable reaction vessel is added 5.7 parts of a rubbery copolymer of about 23.5% styrene and 76.5% butadiene having a refractive index of $n_D$ 1.535, 39.0 parts styrene monomer, 59.0 parts methylmethacrylate, 2.0 parts vinyl stearate and 0.1 part lauroyl peroxide. The rubbery copolymer is dissolved in the monomer mixture and the resulting reaction mixture is bulk polymerized for 6 hours at 85° C. with gentle agitation in the presence of an inert atmosphere and then placed into a closed container and immersed in a 100° C. bath for 17 hours and then a 150° C. bath for an additional 17 hours.

The resultant polymeric material is extruded and then compression molded to form tiles of 1.25 inch thickness.

The following table indicates the proportions of materials in parts by weight employed and resulting properties. In all examples, the method and catalyst of Example 1 was employed.

| Example | Rubbery Polymeric Material (Parts) | Monoalkenyl Aromatic Hydrocarbon (Parts) | Comonomer (Parts) | Izod Impact (ft.-lbs./in.-notch) ½" x ¼" bars | Light transmission (percent at 580 millimicrons) |
| --- | --- | --- | --- | --- | --- |
| 1 | 5.7, Copolymer of 23.5% styrene and 76.5% butadiene. | 39.0, Styrene | 59.0, Methylmethacrylate; 2.0, Vinyl-stearate. | 1.48 | 86.4 |
| 2 | 3, Copolymer of 23.5% styrene and 76.5% butadiene. | 40.0, Styrene | 60.0, Methylmethacrylate | 0.80 | 92.7 |
| 3 | 15, Copolymer of 23.5% styrene and 76.5% butadiene. | 40.0, Styrene | 60.0, Methylmethacrylate | 2.15 | 88.6 |
| 4 | 3, Copolymer of 43.5% styrene and 56.5% butadiene. | 59.0, Styrene | 41.0, Methylmethacrylate | 0.62 | 84.2 |
| 5 | 15, Copolymer of 43.5% styrene and 56.5% butadiene. | 59.0, Styrene | 41.0, Methylmethacrylate | 1.30 | 82.2 |
| 6 | 5, Chloroprene | 62.0, Styrene | 38.0, Methylmethacrylate | 1.00 | 83.8 |
| 7 | 5, Butadiene | 22.5, Styrene | 77.5, Methylmethacrylate | 0.85 | 80.0 |
| 8 | 5.7, Copolymer of 23.5% styrene and 76.5% butadiene. | 32.0, Styrene | 68.0, Dimethylitaconate | 1.40 | 86.2 |
| 9 | 5.7, Copolymer of 43.5% styrene and 56.5% butadiene. | 68.0, Styrene | 32.0, Acrylonitrile | 1.52 | 84.4 |

| Example | Rubbery Polymeric Material (Parts) | Monoalkenyl Aromatic Hydrocarbon (Parts) | Comonomer (Parts) | Izod Impact (ft.-lbs./in.-notch) ½" x ¼" bars | Light transmission (percent at 580 millimicrons) |
|---|---|---|---|---|---|
| 10 | 5.7, Copolymer of 23.5% styrene and 76.5% butadiene; copolymer of 23.5% styrene and 76.5% butadiene. | 60.0, Styrene | 40.0, Methylmethacrylate; 40.4, Dimethylitaconate. | 1.48 | 87.6 |
| 11 | 5.7, Copolymer of 23.5% styrene and 76.5% butadiene | 44.7, Styrene | 35.3, Methylmethacrylate; 20.0, Acrylonitrile. | 1.60 | 86.3 |
| 12 | 5.7, Copolymer of 23.5% styrene and 76.5% butadiene | 50.4, Styrene | 40.4, Dimethylitaconate; 9.2, acrylonitrile. | 1.50 | 87.1 |
| 13 | 5.7, Copolymer of 23.5% styrene and 76.5% butadiene | 50.0, Vinyltoluene | 50.0, Methylmethacrylate | 1.62 | 85.5 |
| 14 | 5.7, Copolymer of 23.5% styrene and 76.5% butadiene | 57.5, 2,4 dimethylstyrene | 42.5, Methylmethacrylate | 1.48 | 82.2 |
| 15 | 5.7, Copolymer of 23.5% styrene and 76.5% butadiene | 40.0, Alphamethylstyrene | 60.0, Methylmethacrylate | 1.40 | 85.0 |
| 16 | 5.0, Chloroprene | 60.0, Styrene | 10.0, Acrylonitrile; 30.0, Dimethylitaconate. | 1.26 | 85.5 |
| 17 | 5.7, Copolymer of 23.5% styrene and 76.5% butadiene | 45.0, Styrene | 15.0, Acrylonitrile; 40.0, Dimethylitaconate. | 1.38 | 79.8 |
| 18 | 25.0, Copolymer of 43.5% styrene and 56.5% butadiene | 70.0, Styrene | 30.0, Acrylonitrile | 3.25 | 74.0 |
| 19 | 5.7, Copolymer of 23.5% styrene and 76.5% butadiene | 40.0, Styrene | 60.0, Methylmethacrylate | 1.50 | 87.9 |
| 20 | 5.7, Copolymer of 23.5% styrene and 76.5% butadiene | 49.0, Styrene | 49.0, Iso-butylmethacrylate; 2.0, Vinylstearate. | 1.32 | 87.4 |
| 21 | 5.7, Copolymer of 43.5% styrene and 56.5% butadiene | 64.0, Styrene | 34.0, Iso-butylmethacrylate; 2.0 Vinylstearate. | 1.10 | 93.0 |
| 22 | 5.7, Copolymer of 23.5% styrene and 76.5% butadiene | 41.8, Styrene | 38.2, Methylmethacrylate; 10, Acrylonitrile; 10, Dimethylitaconate. | 1.15 | 78.0 |

EXAMPLE 23

In a suitable reaction vessel 5.7 parts of a rubbery copolymer of about 23.5% styrene and 76.5% butadiene having a refractive index of $n_D^{25}$ —1.535 are dissolved in 40 parts of styrene and 60 parts of methylmethacrylate. The reaction mixture is agitated and heated to 85° C. in an inert atmosphere and 0.1 part of lauroyl peroxide is added. After 5 hours 0.2 part lauroyl peroxide, 100 parts of water and 0.12 part of polyvinyl alcohol are added to the reaction vessel. The temperature is raised to 105° C. The polymerization is continued for 8 hours.

The resultant polymeric material is extruded and then compression molded to form tiles of 1.25 inch thickness. Such tiles have a light transmission of 85.3% at 580 millimicrons.

The Izod impact of this material is 1.20.

EXAMPLE 24

Into a suitable reaction vessel is added 80.0 parts of a high soap containing hot rubber latex having a solids content of 40.5%, said solids content comprising a rubbery copolymer of 54% butadiene and 46% styrene, 385 parts of water, 67.7 parts of styrene, 32.3 parts of acrylonitrile, 2 parts potassium persulfate and 2 parts of dodecyl mercaptan. The reaction vessel is stirred, sealed and flushed with nitrogen. Polymerization is carried out at 50° C. for 20.5 hours. The latex is then precipitated and the resulting polymeric material recovered.

The polymeric product obtained has an Izod Impact of 5.0. Compression molded tiles 1.25 inch thick of this polymeric product have a light transmission of 90% at 580 millimicrons.

Many changes and alterations may be made without departing from the spirit and scope of this invention which is set forth in the appended claims which are to be construed as broadly as possible in view of the art.

We claim:
1. A substantially transparent, thermoplastic composition comprising an interpolymer of a mixture of ingredients consisting essentially of:
   (A) about 98–65% by weight, based on the total polymeric weight of the entire composition, of polymerizable monomeric materials which include:
       (1) at least one monoalkenyl aromatic hydrocarbon monomer selected from the class consisting of styrene, vinyltoluene, vinylxylene, ethylvinylbenzene and alpha-methylstyrene in amounts corresponding to about 85–20% by weights of A;
       (2) at least one member of the group consisting of methacrylic acid esters derived from saturated aliphatic alcohols containing 1–8 carbon atoms, itaconic acid esters derived from saturated aliphatic alcohols containing 1–6 carbon atoms, acrylonitrile, and mixtures thereof, in amounts corresponding to about 15–80% by weight of A; and
       (3) a vinyl ester of a saturated monocarboxylic organic acid wherein said acid has at least 8 carbon atoms; said vinyl ester being present in a finite flow enhancing amount up to about 5% by weight of the entire composition; and
   (B) a rubbery polymer of a $C_{4-6}$ conjugated diolefine having a refractive index of $n_D^{25}$—1.513 to $n_D^{25}$—1.576, said rubbery polymer being present in an impact enhancing amount of about 2–35% by weight based on the total polymer weight of the entire composition;
the proportions of the monomeric materials of A being such that if polymerized in the absence of B, a polymer would be produced which would have a refractive index within 0.005 unit of the refractive index of B.

2. The composition of claim 1 wherein the monoalkenyl aromatic hydrocarbon polymer is styrene.

3. The composition of claim 1 wherein said vinyl ester is vinyl stearate.

4. The composition of claim 1 wherein;
   (A) is present in amounts corresponding to about 98%–75% by weight of the entire composition;
   (A) (1) is present in amounts corresponding to about 85%–20% by weight of (A);
   (A) (2) is present in amounts corresponding to about 15%–80% by weight of (A), and is a methacrylic acid ester corresponding to the general formula:

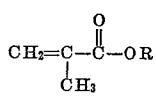

wherein R represents an alkyl radical containing from 1–8 carbon atoms; and (B) present in amounts corresponding to about 2–20% by weight of the entire composition.

5. The composition of claim 1 wherein;
   (A) is present in amounts corresponding to about 98–80% of the entire composition;
   (A) (1) is present in amounts corresponding to about 85%–20% by weight of (A);

(A) (2) is an itaconic acid ester corresponding to the general formula:

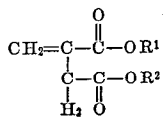

wherein $R^1$ and $R^2$ may be the same or different and each represent an alkyl radical containing from 1 to 6 carbon atoms; and is present in amounts corresponding to about 15%–80% by weight of (A); and
(B) is present in amounts corresponding to about 2%–20% by weight of the entire composition.

6. The composition of claim 1 wherein (A)(2) is acrylonitrile, and is present in amounts corresponding to about 20%–35% of (A).

7. The composition of claim 1 wherein said methacrylic acid ester is methylmethacrylate.

8. The composition of claim 1 wherein said itaconic acid ester is dimethylitaconate.

9. The composition of claim 1 wherein said rubbery polymeric material has a refractive index of $n_D^{25}$—1.530 to $n_D^{25}$—1.576.

10. The composition of claim 1 wherein said rubbery polymeric material has a refractive index of $n_D^{25}$—1.550 to $n_D^{25}$—1.576.

11. A method of producing a substantially transparent, thermoplastic composition comprising polymerizing a solution of ingredients consisting essentially of:
  (A) about 98–65% by weight, based on the total polymeric weight of the entire composition, of polymerizable monomeric materials which include:
    (1) at least one monoalkenyl aromatic hydrocarbon monomer selected from the class consisting of styrene, vinyltoluene, vinylxylene, ethylvinylbenzene and alpha - methylstyrene in amounts corresponding to about 85–20% by weight of A;
    (2) at least one member of the group consisting of methacrylic acid esters derived from saturated aliphatic alcohols containing 1–8 carbon atoms, itaconic acid esters derived from saturated aliphatic alcohols containing 1–6 carbon atoms, acrylonitrile, and mixtures thereof, in amounts corresponding to about 15–80% by weight of A; and
    (3) a vinyl ester of a saturated monocarboxylic organic acid wherein said acid has at least 8 carbon atoms; said vinyl ester being present in a finite flow enhancing amount up to about 5% by weight of the entire composition; and
  (B) a rubbery polymer of a $C_{4-6}$ conjugated diolefine having a refractive index of $n_D^{25}$—1.513 to $n_D^{25}$—1.576, said rubbery polymer being present in an impact enhancing amount of about 2–35% by weight based on the total polymer weight of the entire composition;
the proportions of (A)(1), (A)(2), and (A)(3) being selected so that if interpolymerized in the absence of B, they would have a refractive index within 0.005 unit of the refractive index of B.

12. The method of claim 11 wherein the monoalkenyl aromatic hydrocarbon is styrene.

13. The method of claim 11 wherein said vinyl ester is vinyl stearate.

14. The method of claim 11 wherein (A)(2) is acrylonitrile.

References Cited
UNITED STATES PATENTS

| | | | |
|---|---|---|---|
| 2,118,864 | 5/1938 | Reppe et al. | 260—85.7 XR |
| 2,941,977 | 6/1960 | Roche et al. | 260—892 |
| 3,029,223 | 4/1962 | Hibbard | 260—880 |
| 3,073,798 | 1/1963 | Baer | 260—876 |

FOREIGN PATENTS

| | | |
|---|---|---|
| 589,756 | 12/1959 | Canada. |

GEORGE F. LESMES, *Primary Examiner.*